US011664999B2

(12) United States Patent
Bennett et al.

(10) Patent No.: US 11,664,999 B2
(45) Date of Patent: May 30, 2023

(54) ENSURING THE INTEGRITY OF DATA STORED IN A MEMORY BY USING A WATERMARK

(71) Applicant: Microsoft Technology Licensing, LLC, Redmond, WA (US)

(72) Inventors: John Grant Bennett, Sammamish, WA (US); Greg Zaverucha, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 266 days.

(21) Appl. No.: 17/072,144

(22) Filed: Oct. 16, 2020

(65) Prior Publication Data

US 2022/0123940 A1    Apr. 21, 2022

(51) Int. Cl.
*H04L 29/06* (2006.01)
*H04L 9/32* (2006.01)

(52) U.S. Cl.
CPC .................. *H04L 9/3236* (2013.01)

(58) Field of Classification Search
CPC .. H04L 9/3297; H04L 67/288; H04L 2209/38
See application file for complete search history.

(56) References Cited

U.S. PATENT DOCUMENTS

| 6,574,732 | B1 | 6/2003 | Steinberg et al. | |
| 8,375,225 | B1* | 2/2013 | Ybarra | G06F 21/85 |
| | | | | 713/153 |
| 2007/0233982 | A1* | 10/2007 | Chen | G06F 21/78 |
| | | | | 711/163 |
| 2014/0237611 | A1* | 8/2014 | Dent | H04L 9/14 |
| | | | | 726/26 |
| 2018/0091308 | A1* | 3/2018 | Durham | H04L 9/0631 |
| 2019/0042369 | A1 | 2/2019 | Deutsch et al. | |
| 2019/0043600 | A1 | 2/2019 | Saileshwar et al. | |
| 2020/0104208 | A1 | 4/2020 | Heo et al. | |
| 2020/0403779 | A1* | 12/2020 | Gopal | H04L 9/0643 |
| 2021/0006395 | A1* | 1/2021 | Durham | H04L 9/0825 |
| 2021/0135854 | A1* | 5/2021 | Karame | H04L 9/3247 |

(Continued)

OTHER PUBLICATIONS

Cojocar, et al., "Are We Susceptible to Rowhammer? An End-to-End Methodology for Cloud Providers", In Journal of Computing Research Repository, Mar. 10, 2020, 17 Pages.

(Continued)

*Primary Examiner* — Taghi T Arani
*Assistant Examiner* — Lin Chang
(74) *Attorney, Agent, or Firm* — Ranjeev Singh; Singh Law, PLLC (57) ABSTRACT

Systems and methods related to ensuring the integrity of data stored in a memory by using a watermark are described. An example method in a system including a processor and a memory may include receiving data for storage at an address in the memory. The method may further include after encoding the data with an error correction code to generate intermediate data having a first number of bits, reversibly altering the intermediate data with a watermark to generate watermarked data for storage in the memory, where the watermark is generated by applying a cryptographic function to a user key and the address, and where the watermarked data has a second number of bits equal to the first number of bits.

20 Claims, 7 Drawing Sheets

(56) References Cited

U.S. PATENT DOCUMENTS

2021/0281414 A1* 9/2021 Lee .................... H04L 9/085
2021/0390024 A1* 12/2021 Durham ............... H04L 9/0637
2022/0100603 A1* 3/2022 Li ..................... G06F 21/602

OTHER PUBLICATIONS

"International Search Report and Written Opinion Issued in PCT Application No. PCT/US21/043354", dated Oct. 22, 2021, 10 Pages.

* cited by examiner

RECEIVING PLAINTEXT DATA FROM A COMPUTE ENTITY FROM AMONG ONE OF A PLURALITY OF COMPUTE ENTITIES ASSOCIATED WITH A HOST SERVER FOR STORING AT AN ADDRESS IN A MEMORY

710

ENCRYPTING THE PLAINTEXT DATA USING AT LEAST A USER KEY ASSOCIATED WITH THE COMPUTE ENTITY TO GENERATE ENCRYPTED DATA

720

AFTER ENCODING THE ENCRYPTED DATA WITH AN ERROR CORRECTION CODE TO GENERATE INTERMEDIATE DATA HAVING A FIRST NUMBER OF BITS, REVERSIBLY ALTERING THE INTERMEDIATE DATA WITH A MESSAGE AUTHENTICATION CODE TO GENERATE WATERMARKED DATA FOR STORAGE IN THE MEMORY, WHERE THE MESSAGE AUTHENTICATION CODE IS GENERATED BY APPLYING A CRYPTOGRAPHIC FUNCTION TO THE USER KEY AND THE ADDRESS, AND WHERE THE WATERMARKED DATA HAS A SECOND NUMBER OF BITS EQUAL TO THE FIRST NUMBER OF BITS

ENSURING THE INTEGRITY OF DATA STORED IN A MEMORY BY USING A WATERMARK

BACKGROUND

Increasingly, computing, storage, and network resources are accessed via distributed computing systems, including the public cloud, private cloud, or a hybrid of the two. The public cloud includes a global network of servers that perform a variety of functions, including storing and managing data, running applications, and delivering content or services, such as streaming videos, electronic mail, office productivity software, or social media. The servers and other components may be located in data centers across the world. While the public cloud offers services to the public over the Internet, businesses may use private clouds or hybrid clouds. Both private and hybrid clouds also include a network of servers housed in data centers. Cloud service providers offer access to these resources by offering cloud computing and storage resources to customers. In any such distributed computing systems, multiple compute entities may access the same memory. In addition, in certain memory systems it may not be clear whether the data retrieved from an address is actually the data that was supposed to be stored at that address. Thus, there is a need for better memory systems where multiple entities may access the same memory.

SUMMARY

One aspect of the present disclosure relates to a method in a system including a processor and a memory. The method may include receiving data for storage at an address in the memory. The method may further include after encoding the data with an error correction code to generate intermediate data having a first number of bits, reversibly altering the intermediate data with a watermark to generate watermarked data for storage in the memory, where the watermark is generated by applying a cryptographic function to a user key and the address, and where the watermarked data has a second number of bits equal to the first number of bits.

In yet another aspect, the present disclosure relates to a system including a host server comprising a memory controller coupled to a memory and a processor. The system may further include a hypervisor, associated with the host server, configured to manage a plurality of compute entities. The memory controller may be configured to: (1) receive data from a compute entity from among one of the plurality of compute entities for storing at an address in the memory, and (2) after encoding the data with an error correction code to generate intermediate data having a first number of bits, reversibly alter the intermediate data with a watermark to generate watermarked data for storage in the memory, where the watermark is generated by applying a cryptographic function to the address, and where the watermarked data has a second number of bits equal to the first number of bits.

In another aspect, the present disclosure relates to a method performed in a host server including a processor and a memory. The method may include receiving plaintext data from a compute entity, from among one of a plurality of compute entities associated with the host server, for storing at an address in the memory. The method may further include encrypting the plaintext data using at least a user key associated with the compute entity to generate encrypted data. The method may further include after encoding the encrypted data with an error correction code to generate intermediate data having a first number of bits, reversibly altering the intermediate data with a message authentication code to generate watermarked data for storage in the memory, where the message authentication code is generated by applying a cryptographic function to the user key and the address, and where the watermarked data has a second number of bits equal to the first number of bits.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Examples described in this disclosure relate to ensuring the integrity of data stored in a multi-user computing system by using a watermark. The data may be stored in memory modules included in a host server. Multiple host servers may be included in a rack of servers or a stack of servers. The host server may be any server in a cloud computing environment that is configured to serve tenants or other subscribers of the cloud computing service. Example memory technologies include, but are not limited to, volatile-memory technologies, non-volatile memory technologies, and quasi-volatile memory technologies. Example memory types include dynamic random access memory (DRAM), flash memory (e.g., NAND flash), ferroelectric random-access memory (FeRAM), magnetic random-access memory (MRAM), phase-change memory (PCM), and resistive random-access memory (RRAM). Broadly speaking, examples of the present disclosure relate to a computing environment in which even if one user can access another user's memory, it cannot do so without being detected. Examples of the techniques described in the present disclosure may be implemented in systems such as personal computers, laptops, mobile phones, cellular towers (e.g., 5G cellular towers), edge-computing sites, gaming controllers or other like devices.

Cloud computing may refer to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly. A cloud computing model can be composed of various characteristics such as, for example, on-demand self-service, broad network access, resource pooling, rapid elasticity, measured service, and so forth. A cloud computing model may be used to expose various service models, such as, for example, Hardware as a Service ("HaaS"), Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth.

Figure 1:
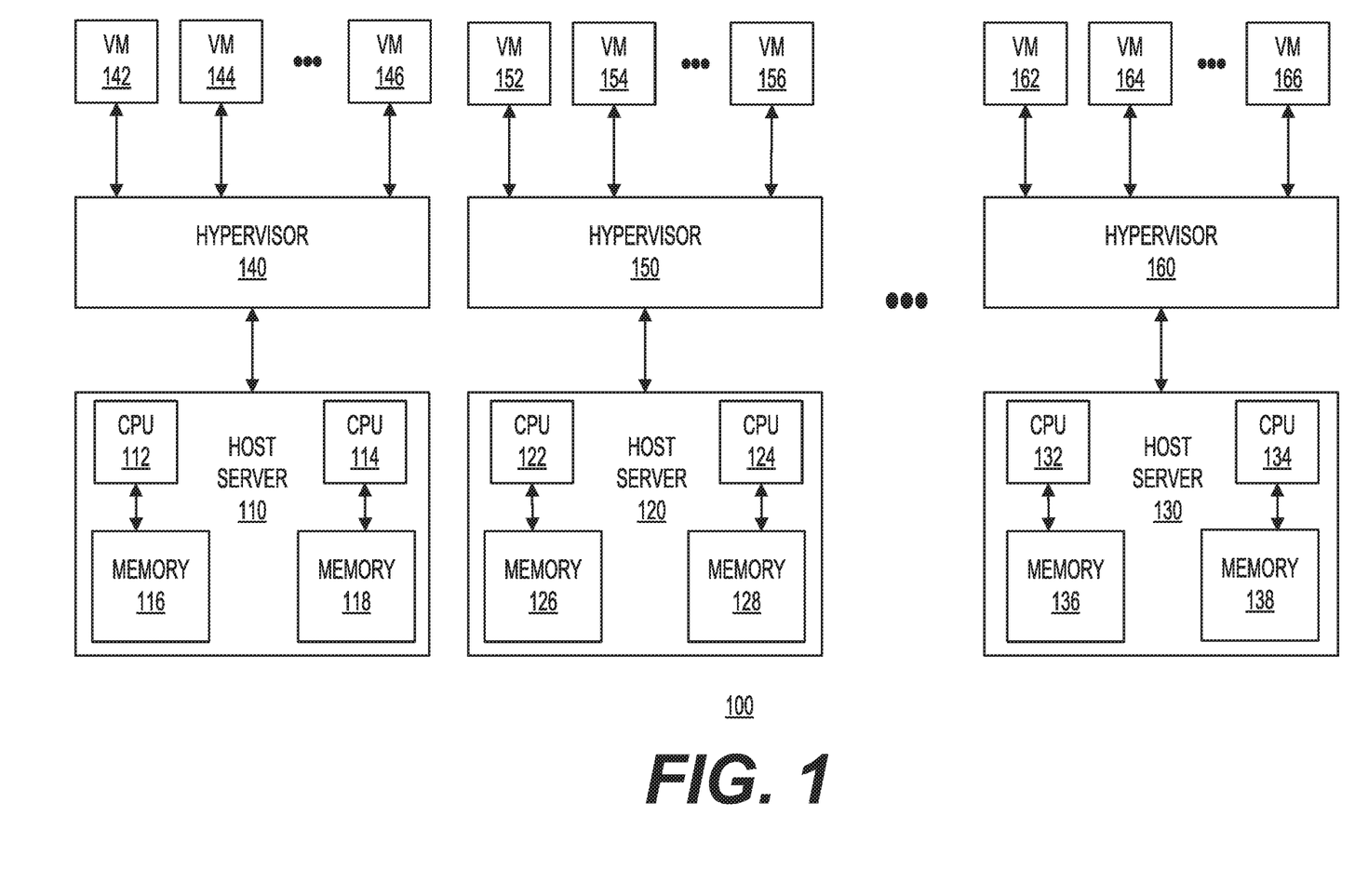
FIG. 1 shows a diagram of a system environment for ensuring the integrity of data by using a watermark in accordance with one example.

FIG. 1 shows a diagram of a system environment 100 for ensuring the integrity of data stored by using a watermark in accordance with one example. In this example, system environment 100 may correspond to a cloud computing stack in a data center. System environment 100 may be implemented as a rack of servers. In this example, system environment 100 may include host servers 110, 120, and 130. Each of the host servers may include one or more processors configured to provide at least some form of compute functionality. As an example, host server 110 may include CPU 112 and CPU 114, host server 120 may include CPU 122 and CPU 124, and host server 130 may include CPU 132 and CPU 134. Host server 110 may further include memory 116 and memory 118. Host server 120 may further include memory 126 and memory 128. Host server 130 may further include memory 136 and memory 138.

With continued reference to FIG. 1, host server 110 may be configured to execute instructions corresponding to hypervisor 140. Hypervisor 140 may further be configured to interface with virtual machines (VMs) (e.g., VM 142, VM 144, and VM 146). Instructions corresponding to the VMs may be executed using either of CPU 112 or CPU 114 associated with host server 110. Hypervisor 150 may further be configured to interface with virtual machines (VMs) (e.g., VM 152, VM 154, and VM 156). Instructions corresponding to these VMs may be executed using either of CPU 122 or CPU 124 associated with host server 120. Hypervisor 160 may further be configured to interface with virtual machines (VMs) (e.g., VM 162, VM 164, and VM 166). Instructions corresponding to these VMs may be executed using either of CPU 132 or CPU 134 associated with host server 130.

Hypervisor 140 may share control information with hypervisor 150 via a control path. The control path may correspond to a path implemented using a bus system (e.g., a server rack bus system or other types of bus systems). Hypervisor 150 may share control information with hypervisor 160 via another control path. The control path may correspond to a path implemented using a bus system. Each of hypervisor 140, hypervisor 150, and hypervisor 160 may be a kernel-based virtual machine (KVM) hypervisor, a Hyper-V hypervisor, or another type of hypervisor. Although FIG. 1 shows system 100 as including a certain number of components arranged and coupled in a certain way, it may include fewer or additional components arranged and coupled differently. As an example, although not shown in FIG. 1, each host server may include an operating system for managing certain aspects of the host server. As another example, system 100 may include any number of host servers combined as part of a rack or a stack. As another example, each host server may include any number of CPUs, GPUs, memory modules, or other components, as needed for providing cloud computing, storage, and/or networking functions. In addition, the functionality associated with system 100 may be distributed or combined, as needed. Moreover, although FIG. 1 describes the access to the host server's memory by VMs, other types of compute entities, such as containers, micro-VMs, microservices, and unikernels for serverless functions, may access the memory in a like manner. As used herein, the term "compute entity" encompasses, but is not limited to, any executable code (in the form of hardware, firmware, software, or in any combination of the foregoing) that implements a functionality, a hypervisor, an application, a service, a micro-service, a container, a unikernel for serverless computing, or a part of the aforementioned.

Figure 2:
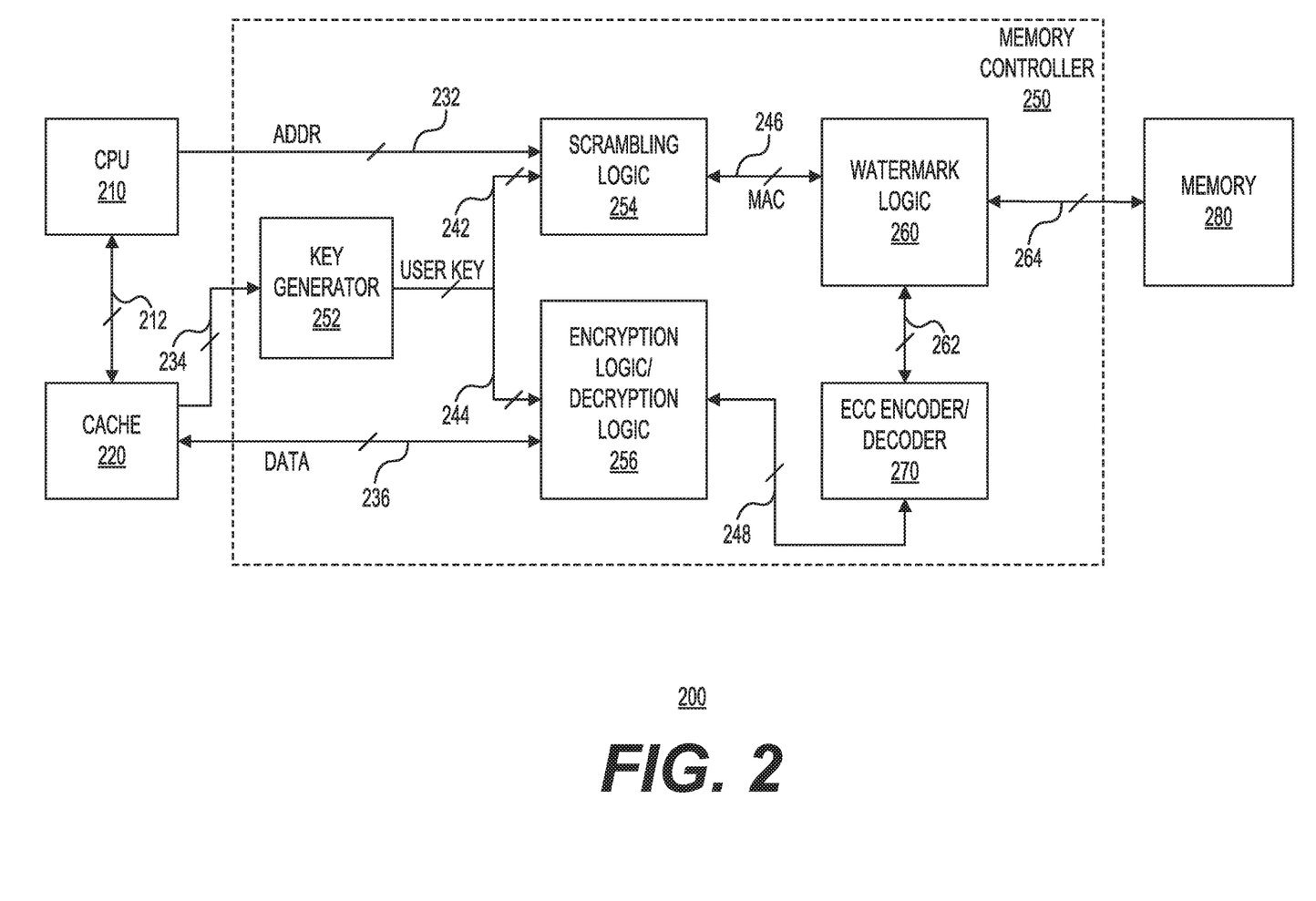
FIG. 2 shows a diagram of a host server including a system for ensuring the integrity of data by using a watermark in accordance with one example.

FIG. 2 shows a host server 200 including a memory controller 250 in accordance with one example. Host server 200 may include a CPU 210, cache 220, memory controller 250, and memory 280. CPU 210 may be coupled to cache 220, via bus 212, to allow fast access to cached instructions or data. In this example, cache 220 may be an L2 cache and may also be coupled to other caches, such as an L1 cache (not shown). CPU 210 may be coupled to memory controller 250 to allow or the exchange of data/control signals. Cache 220 may also be coupled to memory controller 250 to allow for exchange of data and metadata or other information. In one example, CPU 210, cache 220, and memory controller 250 may be incorporated in a single module (e.g., an SoC). Memory controller 250 may be coupled to memory 280 via a bus 264 (e.g., a DDR memory bus or another type of bus). Memory 280 may correspond to any of the various types of storage media, including random access memories (e.g., DRAM), storage class memories, or any other type of storage suitable for storing data for use as part of host server 200. In addition, although not shown, a clock source may be used to synchronize signals, as needed. Clock source may be implemented as a phase-locked loop (PLL) circuit or another type of clocking circuit. In one example, memory 280 may correspond to DRAM modules (e.g., DIMMs) coupled via a bus 264 (e.g., a single channel or multiple channels) to memory controller 250. Each memory module may include memory chips.

With respect to the access to memory (e.g., DIMMs) associated with the host server, at a broad level, there may be two ways for a compute entity (e.g., a virtual machine (VM)) to access a host server's memory. In those instances, where the VM is accessing the physical memory associated with the CPU it is being executed, then load or store accesses may be translated to the bus transactions by the hardware associated with the system.

Still referring to FIG. 2, memory controller 250 may receive addresses (ADDR) from CPU 210 via bus 232. Memory controller 250 may include address decoding logic (not shown) to decode the received address and provide commands to memory 280. As an example, in case memory 280 is implemented as a DRAM, memory controller 250 may decode the received address into appropriate control signals for accessing the DRAM. In this example, the addresses may correspond to host physical addresses. In one example, an operating system (not shown) associated with host server 200 may maintain a mapping between virtual addresses (used by compute entities such as virtual machines) and host physical addresses. A memory management unit (MMU) associated with CPU 210 may translate the virtual addresses into host physical addresses. Other appropriate address translation mechanisms may also be used. Memory controller 250 may further maintain a mapping between the host physical addresses and the logical addresses for memory 280. As an example, in case memory 280 is a DRAM, then logical addresses may correspond to DDR logical addresses.

Memory controller 250 may receive data (DATA) from cache 220 via bus 236. Memory controller 250 may include a key generator 252. Key generator 252 may be coupled via a bus 242 to scrambling logic 254. Key generator 252 may further be coupled via a bus 244 to encryption logic/decryption logic 256. Scrambling logic 254 may be coupled via a bus 246 with watermark logic 260. Encryption logic/decryption logic 256 may be coupled to ECC encoder/decoder 270 via bus 248. ECC encoder/decoder 270 may be coupled via a bus 262 to watermark logic 260. Watermark logic 260 may be coupled via a bus 264 to memory 280. Although FIG. 2 shows system host server 200 and memory controller 250 as including a certain number of components arranged and coupled in a certain way, each may include fewer or additional components arranged and coupled differently. As an example, although not shown in FIG. 2, each host server 200 may include an operating system for managing certain aspects of the host server. As another example, each host server 200 may include any number of CPUs, GPUs, memory modules, or other components, as needed for providing cloud computing, storage, and/or networking functions. In addition, the functionality associated with host server 200 may be distributed or combined, as needed. Moreover, memory controller 250 may include additional functionality, including the ability to control multiple channels coupled to different memory media. As another example, watermark logic 260 may be coupled to a channel controller (not shown), which may in turn be coupled to memory 280.

With continued reference to FIG. 2, in one example, hypervisor may assign a unique logical number to each user (e.g., a guest UM). This logical number may be referred to as a user ID. CPU 210 may provide the user ID to cache 220, such that it could be broadcast to all memory channels associated with CPU 210. Thus, with respect to host server 200, the user ID may be provided to key generator 252 included as part of memory controller 250. The channel associated with memory controller 250 may generate a number to serve as the key for the user associated with the user ID. When a write operation is performed for a user, the user ID may be used to generate a user key, or a previously generated user key may be used. Thus, in one example, when memory controller 250 is notified of a new valid user ID, key generator 252 may generate a user key corresponding to the user ID and store it inside memory controller 250. In this manner, when a preexisting user ID is associated with a memory operation, memory controller 250 may simply use the stored user key instead of generating a new user key.

A CPU (e.g., CPU 112 of FIG. 1) may access both memory 116 and memory 118 using the same user ID for a compute entity. In addition, a memory operation performed by a compute entity running on CPU 112, CPU 114, or on both CPU 112 and CPU 114 at the same time, may use the same user ID regardless of which CPU initiates the memory operation. In another example, the user ID may be local to each CPU. Thus, in a system with two CPUs, one CPU may register the user ID as X with its attached memory controller and the other CPU may register the user ID as Y with its attached memory controller, and a bus system interconnecting the two CPUs (e.g., the UPI bus) may translate between the two user IDs so that the correct user ID (X or Y) is presented to the memory controller servicing the memory operation at issue. The user key (e.g., USER KEY) may be used to encrypt the data so as to convert the data from plaintext to ciphertext. As an example, encryption logic; decryption logic 256 may be used to convert the data from plaintext into ciphertext. When a read operation is performed on behalf of the same user, then the same previously generated user key may be used for the decryption. As an example, encryption logic/decryption logic 256 may be used for performing encryption and decryption.

Once a user key is generated it may be stored as part of an array (or another type of data structure) inside memory controller 250. Memory controller 250 may be configured such that the user keys cannot be accessed from outside and do not ever exit memory controller 250. At some time later the hypervisor may determine that the compute entity (e.g., a guest VM) requires shutdown or termination. This may be a result of a virtual machine being uninstalled or otherwise being terminated. Hypervisor (e.g., any of hypervisors 140, 150, or 160) may broadcast another command to memory controller 350 indicating that the user ID associated with the compute entity is no longer valid. Memory controller 250 may erase the user key associated with the compute entity (e.g., a guest VM). Thus, even if CPU 210 issues an instruction to read data associated with the user ID of the compute entity that is no longer valid, memory controller 250 would not be able to generate the correct watermark, and an exception would be thrown. This way, even malicious code posing as the user with the invalid user ID would not be able to get to that data because the user key associated with the invalid user ID has already been erased.

Still referring to FIG. 2, the encrypted data may be encoded using an ECC code. Example ECC codes include but are not limited to Reed-Solomon codes, Bose-Chaudhuri-Hocquenghem (BCH) codes, and Low Density Parity Check (LDPC) codes. As an example, ECC encoder/decoder 270 may generate 576 bits of code of which 512 bits may be data bits and 64 bits may be ECC bits.

With continued reference to FIG. 2, after encoding the encrypted data with an error correction code to generate intermediate data having a first number of bits (e.g., 576 bits of which 512 bits may be data bits and 64 bits may be ECC bits), watermark logic 260 of FIG. 2 may be used to apply a watermark (e.g., a message authentication code (MAC)) to the intermediate data to generate watermarked data for storage in the memory. In one example, the MAC may be a cryptographic function with a key and an input. To ensure a stronger security guarantee, in one example, the function may be a pseudorandom function. The watermark may be combined with the intermediate data using any type of permutation, scrambling, or combining function that results in a reversible alteration of the intermediate data. Appropriate MACs may be constructed with hash functions (e.g., HMAC (Keyed-Hashing for Message Authentication), KMAC (KECCAK Message Authentication Code) or block ciphers (e.g., Advanced Encryption Standard (AES)-CMAC). Although such MACs have a fixed output length, they can be applied repeatedly to the input along with a counter to create as many output bits as needed. Apart from MACs, other keyed cryptographic functions that have a pseudorandom output may also be used. As an example, block ciphers (e.g., Advanced Encryption Standard (AES)-cipher block chaining (CBC) or AES-CTR (Counter block mode)) may be used to encrypt the user key and/or the address and counter. In addition, stream ciphers where the output depends on the user key and address may also be used.

Example alterations include but are not limited to performing an exclusive OR operation between the watermark and the intermediate data, rotating the intermediate data based on the watermark, and other alterations that are reversible in nature. The watermark is selected to ensure that the position of errors is not changed after the application of the watermark. As an example, Reed-Solomon code can be understood as having symbols that must be aligned at certain points. Assuming, in one example, the application of the watermark is a rotation, and thus some of the bits of the symbol are rotated into a different symbol, while some of those bits of the symbol are left in the original symbol. In this example, if there was an actual error in the data, there is a possibility that there was an error in only one symbol and the underlying memory media is designed to try to keep fault mechanisms localized to a single symbol. Because those bits have been moved into two separate symbols, the error can no longer be corrected. Accordingly, in this example, the memory system has been weakened by transforming a correctable error into an uncorrectable error. If instead, no bits were allowed to go into a different symbol, then the memory system has not been weakened because even if the bits were moved to different locations within the same symbol, the error can still be corrected. Hence, a rotation that does not result in data bits moving across symbols may be a valid permutation to use. For example; the exclusive OR mechanism does not move bits at all, and so the errors remain in the original underlying position and thus are exactly as correctable as before the application of the watermark.

In response to a read request from CPU 210 for reading data at an address, the watermark may be applied to the retrieved watermarked data (e.g., stored in memory 280) to generate intermediate data. As an example, watermark logic 260 may permute the watermark with the watermarked data retrieved from the address to generate the intermediate data. ECC encoder/decoder 270 may decode the intermediate data to generate decoded data; if the decoding results in an uncorrectable error the read operation may be terminated by memory controller 250, otherwise the decoded data may be decrypted using encryption logic/decryption logic 256 to generate plaintext data. The plaintext data may be provided to CPU 210 via cache 220.

In sum, in the examples associated with the present disclosure, the example memory controller is configured to generate an authentication code (e.g., a message authentication code (MAC)) but rather than write it as additional data into the memory, it is used to reversibly alter the data encoded by the error correction code (ECC). In conventional systems, a MAC may be stored as metadata besides the user data and the ECC. Since every bit is a precious resource this causes conflicts such as a compromise between the size of the MAC and the strength in the ECC. Moreover, a system in which the ECC strength is reduced cannot really be more secure because the corruption of the data bits is a possible attack vector. One of the advantages of the permutation scheme is that there is no competition for the metadata bits, and at the same time there is no weakening of the ECC. Thus, in other words, the message authentication code (MAC) is used as an implicit MAC rather than as an explicit MAC for ensuring the integrity of the data stored in the memory.

In such a system, the matching read and write operations add and subtract entropy to the data bits in a precise balance so that when the MACs match, which is required, the information for the MAC effectively disappears and the ECC system has full integrity. Certain examples of the present disclosure further require that the allowed permutations must be ones which do not move bits outside of their correction symbol, and additionally the MAC may be used in the ECC for purposes such as adjusting weightings due to physical differences in error rate on different bit positions.

In certain examples, without requiring additional metadata bits, methods of imprinting a message authentication code into the data storage are described. These techniques use the MAC to permute the data during the write operation, and the same MAC is used to reverse the alterations during the read operation. This data is reversibly altered after the error correction code is computed. If the user performing the write operation is different from the user performing the read operations, their keys would be different from each other and thus their MACs will not match so the reversible alteration will not be reversed and the ECC will fail. In effect, in such examples, the MAC has been stored as a "watermark" which needs no additional bits, and the ECC mechanism is borrowed to function as the MAC integrity check.

If the MAC used by the writer is not the same as the MAC used by the reader, then the reversibly altered data will not match, and the data is not restored to the original value. The reversible alteration operation is performed across all bits, thereby effectively generating a random codeword, so the ECC will report mismatches as uncorrectable errors. In these examples, the ECC integrity must be strong enough to support security requirements since the system would not be secure if other causes of error were not detected. Advantageously, the use of the MAC to reversibly alter the data eliminates storage overhead. In effect, the MAC entropy is orthogonally imprinted into all the data bits, but if the same MAC is used by the reader then the imprint is completely removed so the data may proceed through error correction with the full strength and integrity of error correction unimpaired. The reversible alteration method is required to be such that if an error does occur in the data during storage then that error remains correctable after the reversible alteration is reversed. In certain examples, this is achieved by using each bit of the MAC to guide a very localized transformation where all bits remain within the same correction symbols.

Assuming in a DRAM-based memory system there are 64 bits of metadata per 512 bits of data, then the Reed-Solomon error correction code could be configured to repair just one 16-bit symbol. This would leave approximately 42 bits of integrity check built into the ECC algorithm. Alternatively, with the 64 bits of metadata per 512 bits of data, the Reed-Solomon error correction code could be configured to repair two 16-bit symbols. This may increase the reliability slightly, but the integrity may fall to approximately 24 bits. In a different memory system, assuming there are 128 bits of metadata per 512 bits of data, then the Reed-Solomon error correction code could be configured to repair just one 64-bit symbol or two 32-bit symbols. If the 64-bit symbol can be corrected, then this may provide "chip kill" fault protection, assuming each chip provides 64 bits. Thus, even if the chip completely fails, the data could still be recreated. While Reed-Solomon is a good choice for a DRAM-based memory system and has a good level of rejection of false positives, other ECC technology with strong false positive rejection may also be compatible. The main requirement is that the reversible alteration should not weaken the error correction scheme in the presence of routine physical errors. For example, if the memory system uses Flash memory then the application of the watermark may need to be designed not to disturb error repair algorithms for multilevel cells.

Figure 3:
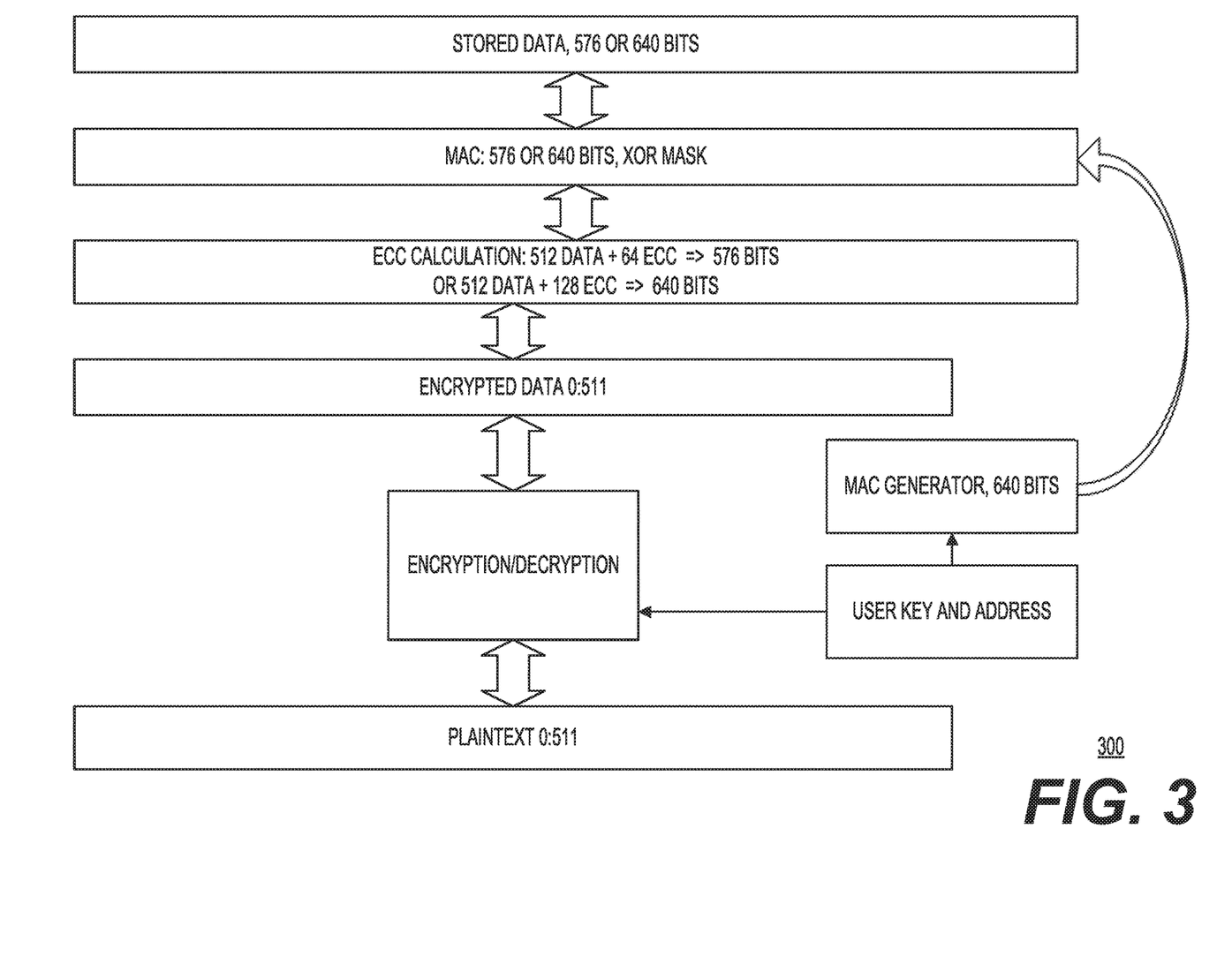
FIG. 3 shows a diagram of a data path for ensuring the integrity of data by using a watermark in accordance with one example.

FIG. 3 shows a diagram of a data path 300 for ensuring the integrity of data by using a watermark in accordance with one example. In this example, the operations on the data and other information (e.g., the user key and the address) may be performed using memory controller 250 of FIG. 2. Data path 300 assumes the data size to be 512 bits. In addition, it is assumed that the users cannot change their identifier and interact with the memory controller as another user. In this example, it is further assumed that users (e.g., compute entities) may access memory with the following functions: (1) Write(address A, data D) (writes data D to address A and D is a fixed-length block of data (512 bits in this example)); (2) Read(address A) (reads data stored at address A); and (3) Corrupt(address A) (models attacks similar to Row-hammer where a user may introduce random corruptions to the data stored at address A). If a user executes Write(A, D), then Read(A), there may be Read, Write, and Corrupt operations in between, executed by other (possibly malicious) users in the system, affecting address A. Moreover, it is assumed that the users cannot access the data written to a media by the memory controller directly, and thus the memory is only accessible via the Read, Write and Corrupt functions. In addition, in this example, user keys are never exported from memory controller 250. Finally, in this example, it is assumed that the intermediate values computed by the memory controller do not leak (by side-channel attacks or directly). Memory controller 250 ensures that a read error is raised signaling corruption of the data if a corrupt operation occurs between writing and reading.

Table 1 shows the movement of data and other operations as part of a storage sequence for storing data using memory controller 250.

TABLE 1

512 bits of data, D, are processed as part of a Store operation, for address A.
Address A + user key K are scrambled together to generate a 640-bit random value M (the MAC). (As an example, (A, K) could be hashed multiple times with SHA3 and a counter (in parallel) to yield M).
Data D is encrypted through AES-256 using user key K to yield 512 bits of encrypted data C.
Encrypted data C is processed through an ECC construction to generate (C, E) with either 64 or 128 bits of E, the ECC code. In this example, (C, E) is either 576 or 640 bits wide.
(C, E) XOR M is computed, yielding X. If (C, E) is 576 bits wide then only 576 bits of M (a chop) are used.
X is stored in the memory media.

Table 2 shows the movement of data and other operations as part of a load sequence for retrieving data from memory 280 of FIG. 2 using memory controller 250 of FIG. 2.

TABLE 2

X' is retrieved from the memory media. If faults occurred in storage, X' may have some bits different from X.
Address A' + user key K' are scrambled together to generate a 640-bit random value M' (the MAC). X' XOR M' yields (C', E'). M' = = M if and only if (A', K') = = (A, K).
If M' = = M then (C', E') should be correctable to yield D with the same probability as if no MAC had been used.
If M' is not M then (C', E') may have an overwhelming number of bit errors across all possible positions.
An uncorrectable error (UE) is reported. In rare cases a silent data corruption (SDC) may pass undetected through the ECC. The silent data corruption (SDC) risk may be TABLE 2-continued designed to have a probability in a range between $2^{-24}$ to $2^{-56}$, depending upon the selected ECC algorithm and the correctable symbol size.
If no uncorrectable error (UE) is reported then K' is used to transform C' into D', the plaintext. If silent data corruption (SDC) passed through the ECC then the plaintext will likely be random junk, otherwise the original data is restored (D' = = D).

Figure 4:
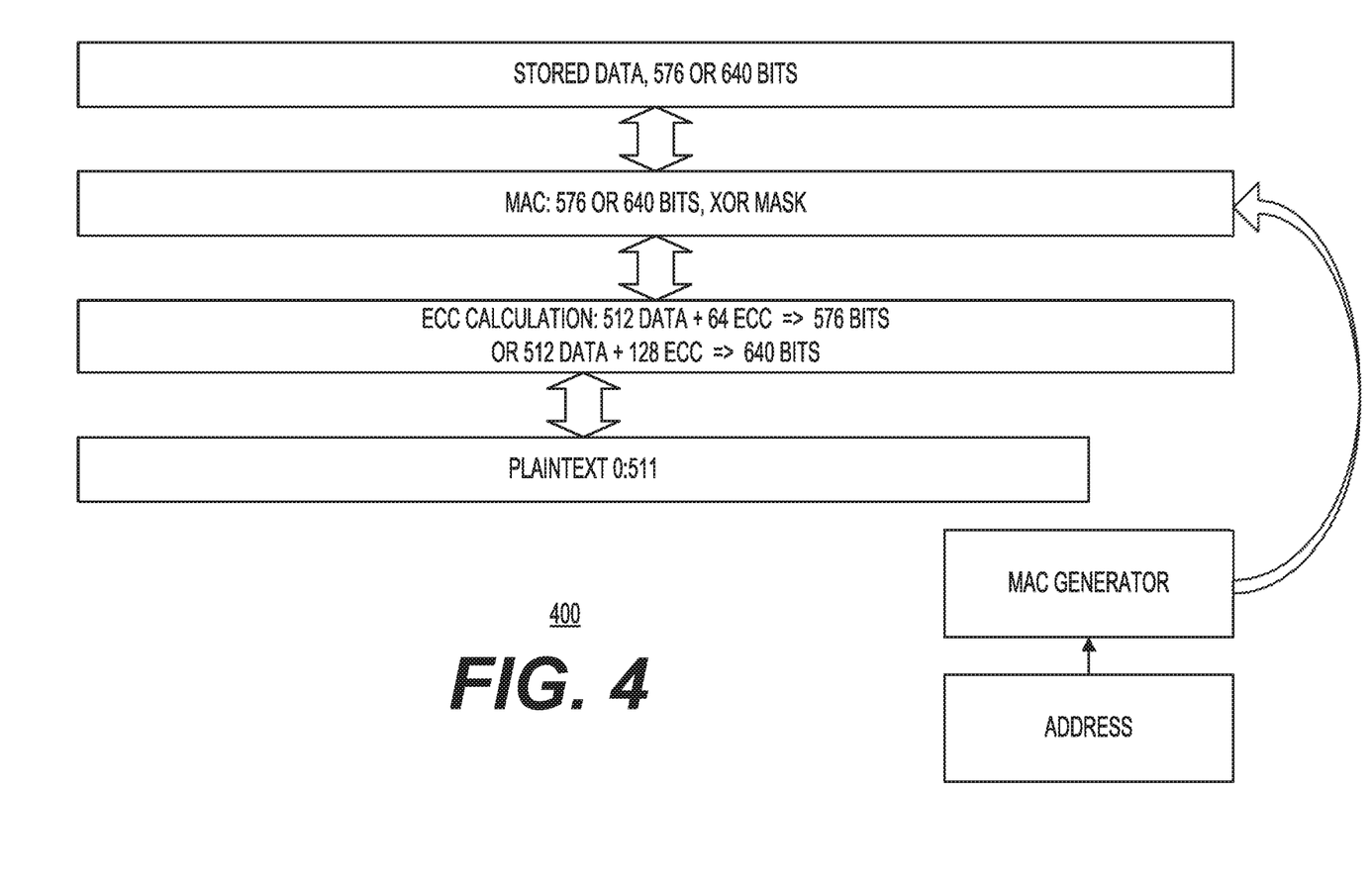
FIG. 4 shows a diagram of another data path for ensuring the integrity of data by using a watermark in accordance with one example.

FIG. 4 shows a diagram of another data path 400 for ensuring the integrity of data by using a watermark in accordance with one example, Data path 400 assumes the data size to be 512 bits. In addition, it is assumed that the users cannot change their identifier and interact with the memory controller as another user. In this example, it is further assumed that users (e.g., compute entities) may access memory with the following functions: (1) Write (address A, data D) (writes data D to address A and D is a fixed-length block of data (512 bits in this example)); (2) Read(address A) (reads data stored at address A); and (3) Corrupt(address A): (models attacks similar to Row-hammer where a user may introduce random corruptions to the data stored at address A). If a user executes Write(A, D), then Read(A), there may be Read, Write, and Corrupt operations in between, executed by other (possibly malicious) users in the system, affecting address A. Moreover, it is assumed that the users cannot access the data written to media by the memory controller directly, memory is only accessible via the Read, Write and Corrupt functions. In addition, in this example, user keys are never exported from memory controller 250. Finally, in this example, it is assumed that intermediate values computed by the memory controller do not leak (by side-channel attacks or directly). Memory controller 250 ensures that a read error is raised signaling corruption of the data if a corrupt operation occurs between writing and reading.

Table 3 shows the movement of data and other operations as part of a storage sequence for storing data using memory controller 250 of FIG. 2.

TABLE 3

512 bits of data, D, are processed as part of a Store operation, for address A.
Address A is scrambled to provide a 640-bit random value M (the MAC). (As an example, A could be hashed with SHA3 and a counter multiple times (in parallel)).
Data D is processed through an ECC construction to generate (D, E) with either 64 or 128 bits of E, the ECC code. (In this example, (D, E) is either 576 or 640 bits wide).
(D, E) XOR M is computed, yielding X. If (D, E) is 576 bits wide then only 576 bits of M (a chop) are used.
X is stored in the memory media.

Table 4 shows the movement of data and other operations as part of a load sequence for retrieving data from memory 280 of FIG. 2 using memory controller 250 of FIG. 2.

TABLE 4

X' is retrieved from the memory media. If faults occurred in storage, X' may have some bits different from X.
Address A' is scrambled to generate 640 bits of a random value M' (the MAC). The value of M' will be identical to M if A' was the same as A. If A' is different (for example, if a wear levelling or other mechanism stored data in the wrong place) then M' will average 50% different bits.

TABLE 4-continued

X' XOR M' yields (D, E)'.
If M' = = M then (D, E)' should be correctable to yield D with the same probability as if no watermark had been used.
If M' is not M then (D, E)' will have an overwhelming number of bit errors across all possible positions. An uncorrectable error (UE) is reported. In rare cases a silent data corruption may pass undetected through the ECC. The silent data corruption (SDC) risk may be designed to have a probability in a range between $2^{-24}$ to $2^{-56}$, depending upon the selected ECC algorithm and the correctable symbol size.

Although Tables 1, 2, 3, and 4 illustrate the use of a specific cryptographic function as part of the scrambling operation to generate the message authentication code, other techniques described earlier may instead be used. As an example, hash functions (e.g., HMAC (Keyed-Hashing for Message Authentication), KMAC (KECCAK Message Authentication Code) or block ciphers (e.g., Advanced Encryption Standard (AES)-CMAC) may be used. In addition, as noted earlier, apart from the MACs, other keyed cryptographic functions that have a pseudorandom output may also be used. As an example, block ciphers (e.g., Advanced Encryption Standard (AES)-cipher block chaining (CBC) or AES-CTR (Counter block mode)) may be used to encrypt the user key and/or the address and a counter. Although the examples described with respect to FIG. 3 and FIG. 4 describe the XOR operation as part of the data paths, other permutations may also be used. As an example, other permutations include rotating the bits or dividing certain bits among groups and using those bits to either leave the bits in the same order as before or reverse the order of the bits. In general, any reversible operation such as an XOR operation may be used for permutations.

Figure 5:
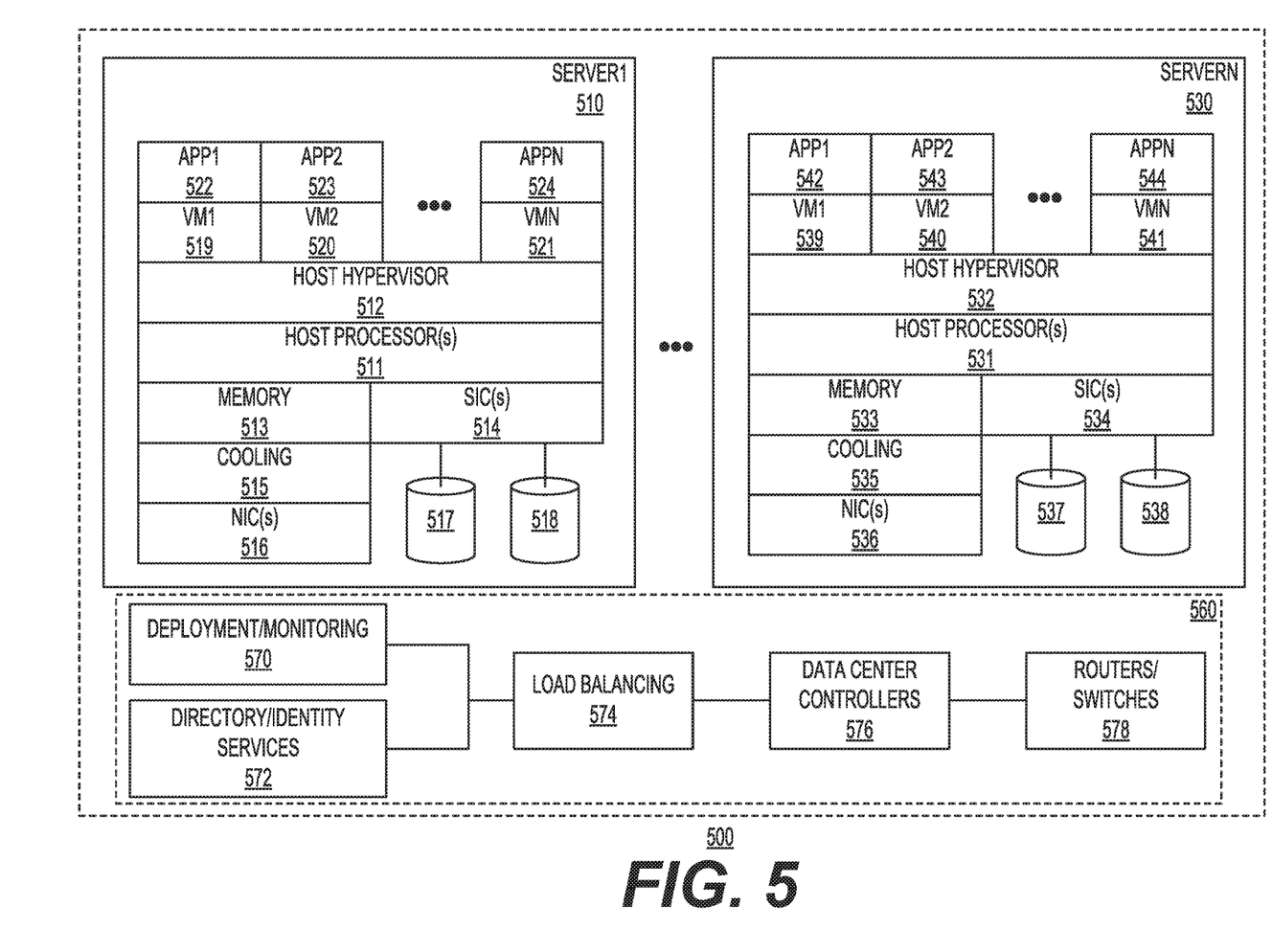
FIG. 5 shows a system environment for implementing a system for ensuring the integrity of data by using a watermark in accordance with one example.

FIG. 5 shows a system environment 500 for implementing systems and methods in accordance with one example. In this example, system environment 500 may correspond to a portion of a data center. As an example, the data center may include several clusters of racks including platform hardware, such as server nodes, storage nodes, networking nodes, or other types of nodes. Server nodes may be connected to switches to form a network. The network may enable connections between each possible combination of switches. System environment 500 may include server1 510 and serverN 530. System environment 500 may further include data center related functionality 560, including deployment/monitoring 570, directory/identity services 572, load balancing 574, data center controllers 576 (e.g., software defined networking (SDN) controllers and other controllers), and routers/switches 578. Server1 510 may include host processor(s) 511, host hypervisor 512, memory 513, storage interface controller(s) (SIC(s)) 514, cooling 515 (e.g., cooling fans or other cooling apparatus), network interface controller(s) (NIC(s)) 516, and storage disks 517 and 518. ServerN 530 may include host processor(s) 531, host hypervisor 532, memory 533, storage interface controller(s) (SIC(s)) 534, cooling 535 (e.g., cooling fans or other cooling apparatus), network interface controller(s) (NIC(s)) 536, and storage disks 537 and 538. Server1 510 may be configured to support virtual machines, including VM1 519, VM2 520, and VMN 521. The virtual machines may further be configured to support applications, such as APP1 522, APP2 523, and APPN 524. ServerN 530 may be configured to support virtual machines, including VM1 539, VM2 540, and VMN 541. The virtual machines may further be configured to support applications, such as APP1 542, APP2 543, and APPN 544.

With continued reference to FIG. 5, in one example, system environment 500 may be enabled for multiple tenants using the Virtual eXtensible Local Area Network (VXLAN) framework. Each virtual machine (VM) may be allowed to communicate with VMs in the same VXLAN segment. Each VXLAN segment may be identified by a VXLAN Network Identifier (UNI). Although FIG. 5 shows system environment 500 as including a certain number of components arranged and coupled in a certain way, it may include fewer or additional components arranged and coupled differently. In addition, the functionality associated with system environment 500 may be distributed or combined, as needed. Moreover, although FIG. 5 shows VMs, other types of compute entities, such as containers, micro-VIM, microservices, and unikernels for serverless functions, may also be used in a like manner.

Figure 6:
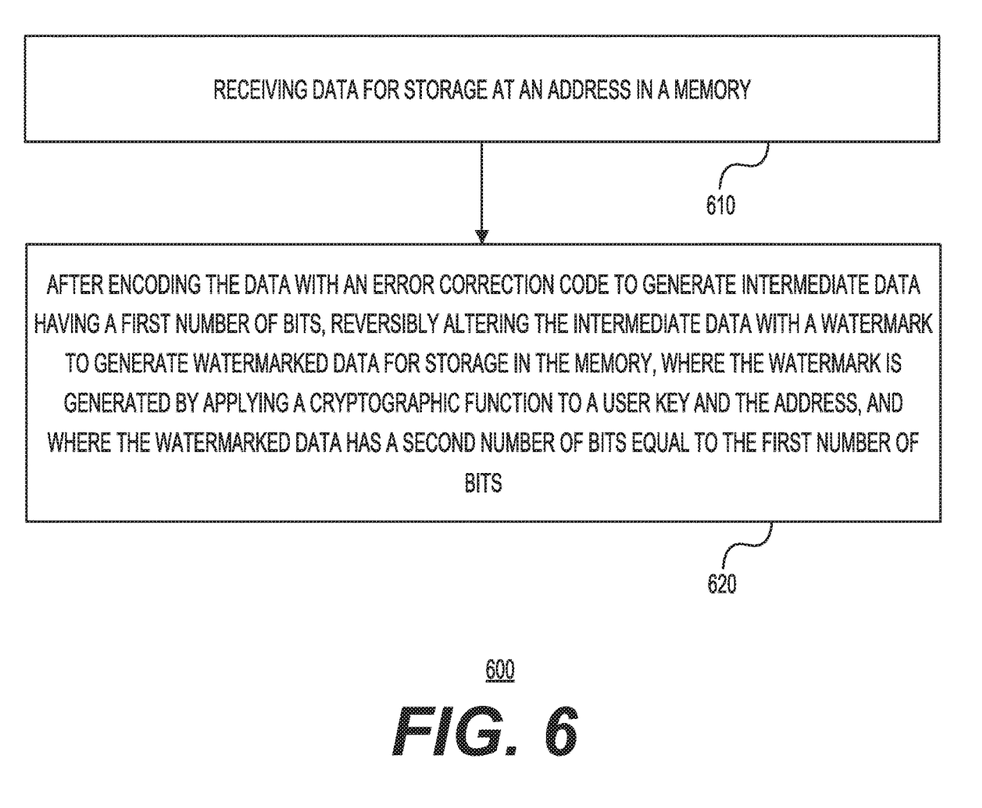
FIG. 6 shows a flowchart of a method in accordance with one example.

FIG. 6 shows a flowchart 600 of a method in accordance with one example. In this example, this method may be performed in a system including a processor and a memory. As an example, this method may be performed as part of a host server 200 of FIG. 2 as part of system environment 100 of FIG. 1. Step 610 may include receiving data for storage at an address in the memory. As an example, as part of step 610, a memory controller (e.g., 250 of FIG. 2) may receive data from cache 220 for storing an address (ADDR) provided by CPU 210. In addition, in one example, the data may be the 512 bits of plaintext data described with respect to FIG. 3 and Table 1.

Step 620 may include after encoding the data with an error correction code to generate intermediate data having a first number of bits, reversibly altering the intermediate data with a watermark to generate watermarked data for storage in the memory, where the watermark is generated by applying a cryptographic function to a user key and the address, and where the watermarked data has a second number of bits equal to the first number of bits. As an example, a memory controller (e.g., memory controller 250 of FIG. 2) may perform this step as described with respect to FIGS. 2 and 3. In this example, after encoding the data with an error correction code to generate intermediate data having a first number of bits (e.g., 576 bits of which 512 bits may be data bits and 64 bits may be ECC bits), watermark logic 260 of FIG. 2 may be used to reversibly alter the intermediate data with a watermark (e.g., a MAC) to generate watermarked data for storage in the memory. Example reversible alterations include but are not limited to performing an exclusive OR operation between the watermark and the intermediate data, rotating the intermediate data based on the watermark, and other alterations that are reversible in nature, Additional examples of the MACs and other watermarks are described earlier with respect to FIG. 2. Although FIG. 6 describes flow chart 600 as including a certain number of steps being executed in a certain order, the method may include additional or fewer steps executed in a different order. The user may comprise one of a hypervisor, a virtual machine (VM), a micro-VM, a microservice, or a unikernel for serverless functions.

Figure 7:
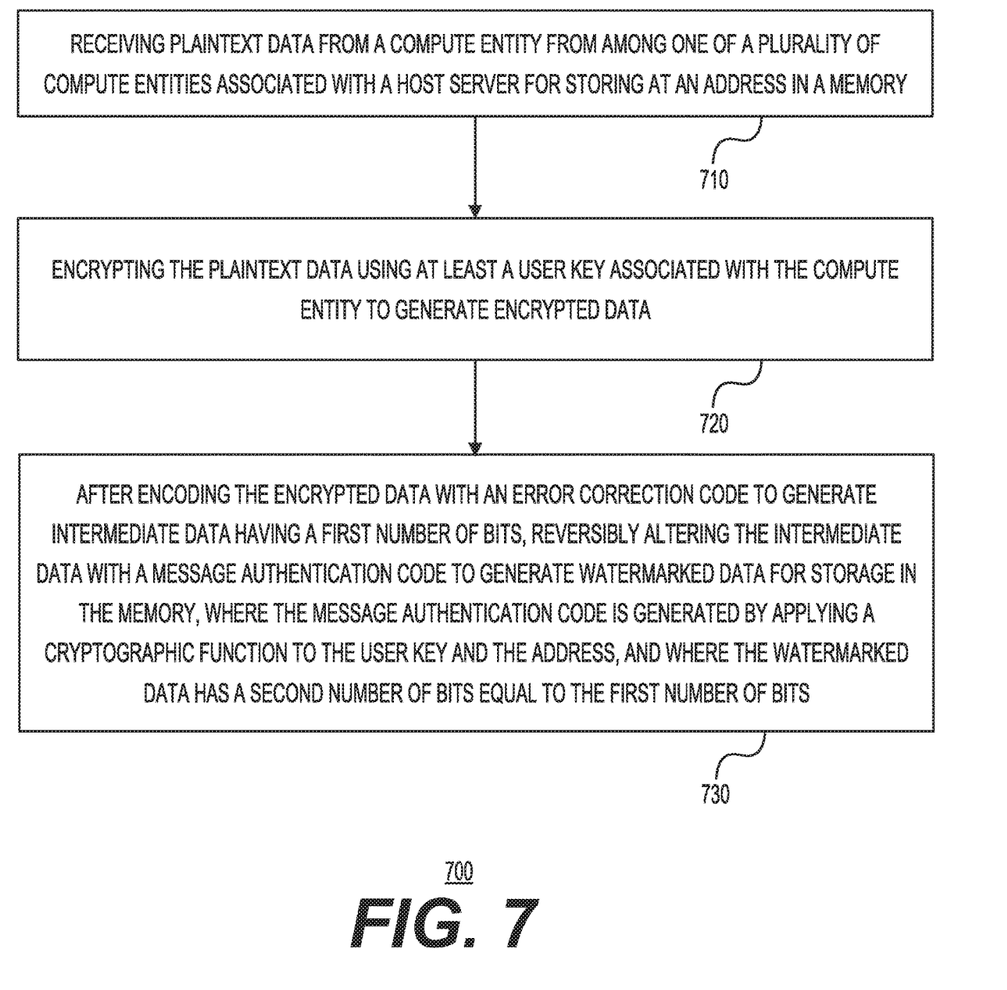
FIG. 7 shows another flowchart of a method in accordance with one example.

FIG. 7 shows another flowchart 700 of a method in accordance with one example. In this example, this method may be performed in a host server including a memory and a processor. As an example, this method may be performed as part of a host server 200 of FIG. 2 as part of system environment 100 of FIG. 1. Step 710 may include receiving plaintext data from one of a plurality of compute entities associated with the host server for storing at an address in the memory. As an example, as part of step 710, a memory controller (e.g., 250 of FIG. 2) may receive plaintext data from cache 220 for storing an address (ADDR) provided by CPU 210. In addition, in one example, the plaintext data may be the 512 bits of plaintext data described with respect to FIG. 3 and Table 1. The compute entity may comprise one of a hypervisor, a virtual machine (VM), a micro-VM, a microservice, or a unikernel for serverless functions.

Step 720 may include encrypting the plaintext data using at least a user key associated with the compute entity to generate encrypted data. As an example, as part of step 720, a memory controller (e.g., 250 of FIG. 2) may encrypt the plaintext data as described earlier with respect to FIG. 2. In addition, in one example, the encrypted data may be 512 bits of encrypted data described earlier with respect to FIG. 3 and Table 1.

Step 730 may include after encoding the encrypted data with an error correction code to generate intermediate data having a first number of bits, reversibly altering the intermediate data with a message authentication code to generate watermarked data for storage in the memory, where the message authentication code is generated by applying a cryptographic function to the user key and the address, and where the watermarked data has a second number of bits equal to the first number of bits. As an example, a memory controller (e.g., memory controller 250 of FIG. 2) may perform this step as described with respect to FIGS. 2 and 3. In this example, after encoding the encrypted data with an error correction code to generate intermediate data having a first number of bits (e.g., 576 bits of which 512 bits may be data bits and 64 bits may be ECC bits), watermark logic 260 of FIG. 2 may be used to reversibly alter the intermediate data with a MAC to generate watermarked data for storage in the memory. Example reversible alterations include, but are not limited, to performing an exclusive OR operation between the MAC and the intermediate data, rotating the intermediate data based on the MAC, and other alterations that are reversible in nature. Additional examples of the MACs and other watermarks are described earlier with respect to FIG. 2. Although FIG. 7 describes flow chart 700 as including a certain number of steps being executed in a certain order, the method may include additional steps executed in a different order.

In conclusion, the present disclosure relates to a method in a system including a processor and a memory. The method may include receiving data for storage at an address in the memory. The method may further include after encoding the data with an error correction code to generate intermediate data having a first number of bits, reversibly altering the intermediate data with a watermark to generate watermarked data for storage in the memory, where the watermark is generated by applying a cryptographic function to a user key and the address, and where the watermarked data has a second number of bits equal to the first number of bits.

The system may further include a memory controller and the method may further include memory controller generating the user key based on a user identifier associated with a user. The system may further include a hypervisor, and the method may further include the hypervisor assigning the user identifier to the user. The user may comprise one of the hypervisor, a virtual machine (VM), a micro-VM, a microservice, or a unikernel for serverless functions.

The intermediate data may further comprise metadata, and the method may further include reversibly altering the intermediate data and the metadata with the watermark.

The method may further include reading the watermarked data from the memory at the address in response to a read operation specifying the address in the memory; recomputing a previously applied watermark to the intermediate data by processing the watermarked data with the user key; and removing the previously applied watermark to generate a second intermediate data. The method may further include decoding the second intermediate data using the error correction code to generate decoded data; and terminating the read operation if the decoding results in an uncorrectable error then.

In yet another aspect, the present disclosure relates to a system including a host server comprising a memory controller coupled to a memory and a processor. The system may further include a hypervisor, associated with the host server, configured to manage a plurality of compute entities. The memory controller may be configured to: (1) receive data from one of the plurality of compute entities for storing at an address in the memory, and (2) after encoding the data with an error correction code to generate intermediate data having a first number of bits, reversibly alter the intermediate data with a watermark to generate watermarked data for storage in the memory, where the watermark is generated by applying a cryptographic function to the address, and where the watermarked data has a second number of bits equal to the first number of bits.

The hypervisor may further be configured to assign a user identifier to the compute entity, and where the memory controller may further be configured to generate a user key based on the user identifier associated with the compute entity. The compute entity may comprise one of the hypervisor, a virtual machine (VM), a micro-VM, a microservice, or a unikernel for serverless functions. The intermediate data may further comprise metadata; and the memory controller may further be configured to reversibly alter the metadata with the watermark.

The memory controller may further be configured to: read the watermarked data from the memory at the address in response to a read request from the compute entity specifying the address; recompute a previously applied watermark to the intermediate data by processing the watermarked data with the address; and remove the previously applied watermark to generate a second intermediate data. The memory controller may further be configured to: decode the second intermediate data using the error correction code to generate decoded data; and terminate the read request if the decoding results in an uncorrectable error.

In another aspect, the present disclosure relates to a method performed in a host server including a processor and a memory. The method may include receiving plaintext data from one of a plurality of compute entities associated with the host server, for storing at an address in the memory. The method may further include encrypting the plaintext data using at least a user key associated with the compute entity to generate encrypted data. The method may further include after encoding the encrypted data with an error correction code to generate intermediate data having a first number of bits, reversibly altering the intermediate data with a watermark to generate watermarked data for storage in the memory, where the message authentication code is generated by applying a cryptographic function to the user key and the address, and where the watermarked data has a second number of bits equal to the first number of bits.

The system may further comprise a memory controller, and the method may further comprise the memory controller generating the user key based on a user identifier associated with the compute entity. The method may further include a hypervisor associated with the host server assigning the user identifier to the compute entity. The compute entity may comprise one of a hypervisor, a virtual machine (VM), a micro-VM, a microservice, or a unikernel for serverless functions. The intermediate data may further comprise metadata, and the method may further comprise reversibly altering the intermediate data and the metadata with the watermark.

The method may further include reading the watermarked data from the memory at the address in response to a read request from the compute entity specifying the address, recomputing a previously applied watermark to the intermediate data by processing the watermarked data with the user key, and removing the previously applied watermark to generate a second intermediate data. The method may further include decoding the second intermediate data using the error correction code to generate decoded data and if the decoding results in an uncorrectable error then terminating the read request otherwise decrypting the decoded data to generate second plaintext data.

It is to be understood that the methods, modules, and components depicted herein are merely exemplary, Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from but can be used in conjunction with transmission media. Transmission media is used for transferring data and/or instruction to or from a machine. Exemplary transmission media include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method in a system including a processor and a memory, the method comprising:
   receiving data for storage at an address in the memory;
   after encoding the data with an error correction code to generate intermediate data having a first number of bits, reversibly altering the intermediate data with a watermark to generate watermarked data for storage in the memory, wherein the watermark is generated by applying a cryptographic function to a user key and the address, and wherein the watermarked data has a second number of bits equal to the first number of bits, and wherein the method further comprises supplying, by a memory controller, the user key based on a user identifier associated with a user; and
   in response to a read operation specifying the address in the memory:
      reading the watermarked data from the memory,
      recomputing a previously applied watermark to the intermediate data by processing the watermarked data with the user key,
      removing the previously applied watermark to generate a second intermediate data,
      decoding the second intermediate data using the error correction code to generate decoded data, and
      terminating the read operation if the decoding results in an uncorrectable error.

2. The method of claim 1, wherein the error correction code comprises a Reed-Solomon error correction code.

3. The method of claim 1, wherein the system further comprises a hypervisor, and wherein the method further comprises the hypervisor assigning the user identifier to the user.

4. The method of claim 1, wherein the user comprises one of the hypervisor, a virtual machine (VM), a micro-VM, a microservice, or a unikernel for serverless functions.

5. The method of claim 1, wherein the intermediate data further comprises metadata, and the method further comprises reversibly altering the intermediate data and the metadata with the watermark.

6. The method of claim 1, wherein the watermark comprises a message authentication code (MAC), and wherein the MAC is used as an implicit MAC.

7. The method of claim 1, further comprising:
correcting the decoded data to generate corrected data if the decoding results in a correctable error.

8. A system comprising:
a host server comprising a memory controller coupled to a memory and a processor; and
a hypervisor, associated with the host server, configured to manage a plurality of compute entities, wherein the memory controller is configured to:
receive data from one of the plurality of compute entities for storage at an address in the memory,
supply a user key based on a user identifier associated with a user,
after encoding the data with an error correction code to generate intermediate data having a first number of bits, reversibly alter the intermediate data with a watermark to generate watermarked data for storage in the memory, wherein the watermark is generated by applying a cryptographic function to the address, and wherein the watermarked data has a second number of bits equal to the first number of bits, and
in response to a read operation specifying the address in the memory:
read the watermarked data from the memory,
recompute a previously applied watermark to the intermediate data by processing the watermarked data with the user key,
remove the previously applied watermark to generate a second intermediate data,
decode the second intermediate data using the error correction code to generate decoded data, and
terminate the read operation if the decoding results in an uncorrectable error.

9. The system of claim 8, wherein the memory controller is further configured to not export the user key from the system.

10. The system of claim 8, wherein the compute entity comprises one of the hypervisor, a virtual machine (VM), a micro-VM, a microservice, or a unikernel for serverless functions.

11. The system of claim 8, wherein the intermediate data further comprises metadata, and wherein the memory controller is further configured to reversibly alter the metadata with the watermark.

12. The system of claim 8, wherein the watermark comprises a message authentication code (MAC), and wherein the MAC is used as an implicit MAC.

13. The system of claim 8, wherein the memory controller is further configured to correct the decoded data to generate corrected data if the decoding results in a correctable error.

14. A method performed in a host server including a processor and a memory, the method comprising:
receiving plaintext data from a compute entity, from among one of a plurality of compute entities associated with the host server, for storing at an address in the memory;
encrypting the plaintext data using at least a user key associated with the compute entity to generate encrypted data; and
after encoding the encrypted data with an error correction code to generate intermediate data having a first number of bits, reversibly altering the intermediate data with a message authentication code to generate watermarked data for storage in the memory, wherein the message authentication code is generated by applying a cryptographic function to the user key and the address, and wherein the watermarked data has a second number of bits equal to the first number of bits, wherein the system further comprises a memory controller, and the method further comprises the memory controller supplying the user key based on a user identifier associated with the compute entity; and
in response to a read operation specifying the address in the memory
reading the watermarked data from the memory,
recomputing a previously applied message authentication code (MAC) to the intermediate data by processing the watermarked data with the user key,
removing the previously applied MAC to generate a second intermediate data,
decoding the second intermediate data using the error correction code to generate decoded data, and
terminating the read operation if the decoding results in an uncorrectable error.

15. The method of claim 14, wherein the error correction code comprises a Reed-Solomon error correction code.

16. The method of claim 14, further comprising a hypervisor associated with the host server assigning the user identifier to the compute entity.

17. The method of claim 14, wherein the compute entity comprises one of a hypervisor, a virtual machine (VM), a micro-VM, a microservices, or a unikernel for serverless functions.

18. The method of claim 14, wherein the intermediate data further comprises metadata, and the method further comprises reversibly altering the intermediate data and the metadata with the watermark.

19. The method of claim 14, wherein the MAC is used as an implicit MAC.

20. The method of claim 14, further comprising correcting the decoded data to generate corrected data if the decoding results in a correctable error.

* * * * *